June 29, 1965  E. P. ROBARE  3,191,189
ANTI-SWEAT WATER CLOSET TANK
Filed Oct. 26, 1962

INVENTOR
E. Peter Robare
BY
*Tennes J. Ersted*
ATTORNEY

United States Patent Office 3,191,189
Patented June 29, 1965

3,191,189
ANTI-SWEAT WATER CLOSET TANK
E. Peter Robare, Louisville, Ky., assignor to American Radiator & Standard Sanitary Corporation, New York, N.Y., a corporation of Delaware
Filed Oct. 26, 1962, Ser. No. 233,320
2 Claims. (Cl. 4—68)

This invention relates to a water closet or urinal flush tank having a liner formed on the interior surfaces thereof and to a method for applying such a liner to a flush tank.

When water closet or urinal flush tanks contain or receive cold water on humid days, the outside surface temperature of the tank, due to the cold water therein, will decrease to a point below the dew point of the surrounding air; and accordingly, the outside surface of the tank will condense moisture from the surrounding air. This moisture will accumulate, resulting in sweating of the tank and dripping down the sides of the tank.

Heretofore, attempts have been made to solve this problem by installing preformed liners in the tank but this has not always been satisfactory, mainly because of the problems encountered in fitting the liner to the tank. Either voids, which would become water filled and conducive to bacterial growth and destroy the insulating value of the liner were left between the liner and the tank, or if the liner was too large for the tank, the liner would tend to become distorted or broken.

Accordingly, it is an object of the present invention to provide a liner for thermal insulation between a flush tank and the water contained therein.

Another object of the present invention is to provide a liner for a flush tank which is formed in place and which conforms and adheres to the inside surfaces of the tank.

Another object is to provide a liner which is bonded to the inside surfaces of a flush tank to thereby eliminate all voids between the liner and the tank thus preventing bacterial growth therebetween and maintaining its insulating value.

Another object is to provide a liner for a flush tank which will not become broken or distorted during normal use.

Another object is to provide a liner for a flush tank which is easy and inexpensive to manufacture.

Another object is to provide a method for manufacturing a liner wherein the liner will always fit properly in a flush tank.

Another object is to provide a method of manufacturing a liner for a flush tank wherein the liner forms a permanent component of the flush tank.

Other objects and features of the invention will appear as the description of the particular physical embodiment selected to illustrate the invention progresses.

For a better understanding of the present invention, reference should be had to the accompanying drawings, wherein like numerals or reference indicate similar parts throughout the several views and wherein.

Figure 1:
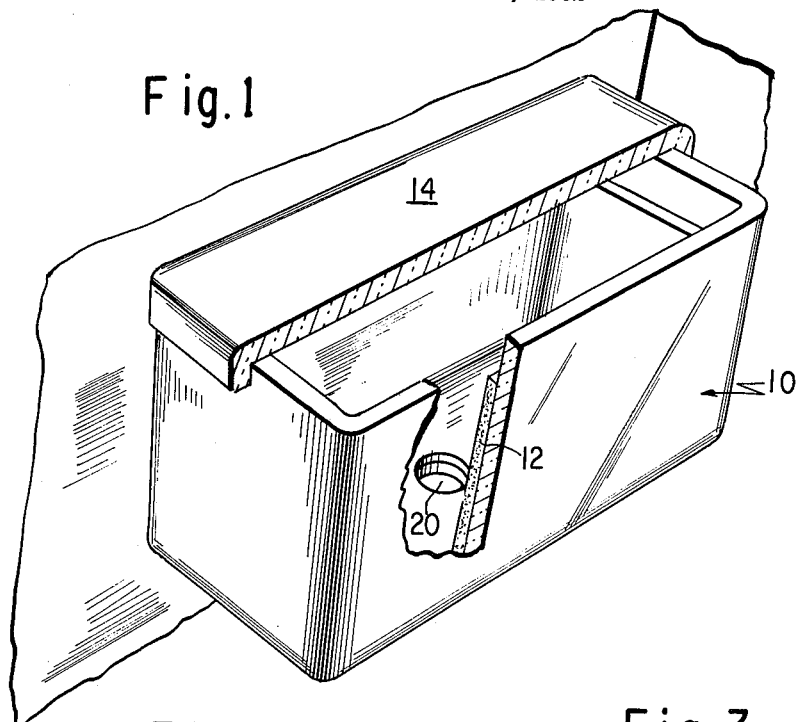
FIGURE 1 is a perspective view, partially broken away, of a water closet tank showing a liner constructed according to the present invention installed on the inside surfaces of the tank.
Figure 2:
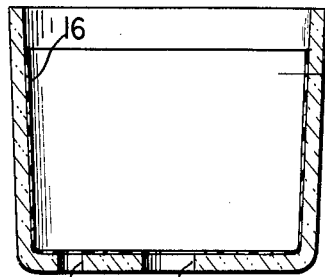
FIGURE 2 is a sectional elevation of a water closet tank showing a primer coating which is initially applied to the inside surfaces of the tank.

Referring to the drawings, FIGURE 1 shows a water closet tank 10 having a liner 12 formed according to the present invention on the inside surfaces thereof to reduce the tendency of the outside of the tank to sweat. The liner 12 covers the bottom and sides of the tank 10 and if desired, may terminate short of the upper edges of the tank 10, as shown in the drawings but above the maximum upper level 13 of the water to be contained in the tank 10 during normal operating conditions. Since the water closet flush valve (not shown) will normally prevent the tank 10 from filling above a predetermined maximum level 13, the liner 12 may terminate slightly above this level 13 as there will normally be no water in the upper portions of the tank above such predetermined maximum upper level 13 against which the tank need be insulated. For this same reason the inside surface of the cover 14 of the tank 10 may also be unlined if desired.

With the liner 10 installed as shown in FIGURE 1, when the temperature of the water entering the tank 10 is lower than the temperature of the surrounding atmosphere, the liner 12 will insulate the tank 10 from the relatively colder water so that the surface temperature of the tank will be higher than the water, and the likelihood of condensation of moisture on the tank 10 and subsequent dripping thereof will be reduced or prevented.

The liner 12 is formed in place within the tank 10 so that the tank will determine the size and shape thereof. In forming the liner a primer coating 16 is first applied to the surfaces to be lined by a brush or other suitable means. Before such primer coating 16 is applied, the surfaces to be lined should be cleaned of foreign matter, if found necessary, so that the primer properly adheres to the tank 10. The primer 16 may be a commercially available lacquer type of product formulated to resist high humidity conditions and which cures when heated, such as, for example, Nelco R–6368 produced by Chemical Products Corporation of East Providence, Rhode Island. The primer is used to adhere the liner to the tank 10 as will be further described hereinafter.

The primer may be applied beyond the area to be lined but the inside cylindrical surfaces of the water inlet and outlet openings 18 and 20 respectively, in the bottom of the tank 10 are not primed to avoid adhesion thereto of the liner as will be hereinafter further described. The primer may be applied at room temperature and allowed to dry and the primed tank 10 is heated.

The heating, which cures the primer as mentioned heretofore, may be done in a furance or by other suitable means. After the tank 10 has reached a predetermined temperature between 250° Fahrenheit and 350° Fahrenheit the source of heat may be removed and plugs 22 and 24 made of suitable material such as wood or rubber are inserted into the water inlet and outlet openings 18 and 20 respectively, and the thank 10 partially filled, as indicated in FIGURE 3 with a liquid liner forming material.

This material has the property wherein it can be converted from a liquid state to a solid mass by raising it to a predetermined temperature. An example of such a material is plastisol which is a dispersion of polyvinyl chloride resin in a suitable liquid plasticizer. The plastisol may be poured into the heated tank 10 while the plastisol is at room temperature or at less than some predetermined temperature such as 100° Fahrenheit, for example.

Since the tank 10 is generally made of a material which is a poor conductor of heat, such as vitreous china, the tank 10 will retain most of its heat during the relatively short time required to pour the plastisol in the tank 10 and form the liner, as hereinafter described, without requiring additional application of heat to the tank after it has been removed from the heat source. However, if desired, the source of heat may be applied to the tank 10 as the plastisol is poured into the tank.

Figure 3:
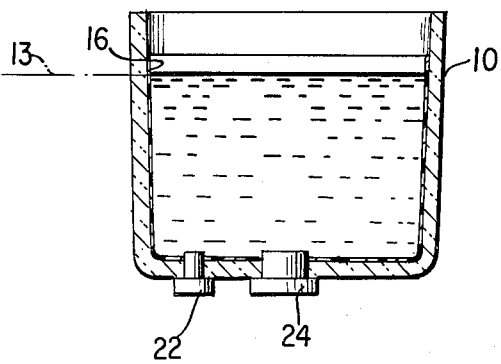
FIGURE 3 is similar to FIGURE 2 but shows the tank filled with a liquid material out of which the liner is to be formed.
Figure 4:
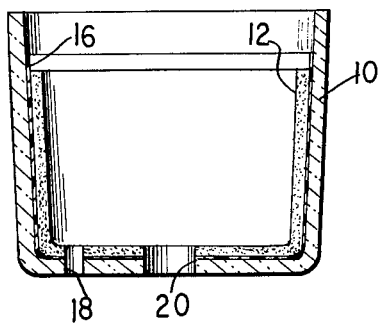
FIGURE 4 is similar to FIGURE 2 but shows the liner formed on the inside of the tank after the liner forming liquid material has been drained from the tank.

The heated tank 10, with the plugs 22 and 25 inserted as previously described, is filled with the plastisol to a level above the maximum upper level 13 of the water to be contained in the tank under normal operating conditions, but below the upper edge of the primer coating 16 as indicated in FIGURE 3 and is held in the tank 10 until a predetermined thickness of liquid plastisol has gelled adjacent the inside previously heated surfaces of the tank 10 to form the liner 12. The thickness of the liner 12, that is, the amount of plastisol which is allowed to gel, is determined by the temperature of the tank 10 and the amount of time that the plastisol is held in the tank 10. These two variable factors can therefore be varied to produce any desired thickness of liner.

After the desired amount of plastisol has gelled adjacent the heated surfaces of the tank, the plugs 22 and 24 are removed from the tank 10 and the ungelled portion of the plastisol is allowed to drain from the tank 10 to be used in lining succeeding tanks. Any excess in the bottom of the tank 10 is swept through the tank openings 18 and 20.

The tank 10 is then heated to a predetermined temperature such as 350° Fahrenheit to cure the plastisol resulting in a tough stable mass. Care must be taken, however, to so cycle the heating such that no part of the tank 10 or liner 12 exceeds a predetermined temperature, such as 400° Fahrenheit for example, to avoid degeneration of the plastisol. After cooling any material in the tank openings 18 and 20 is trimmed out and the necessary fittings are affixed to the tank.

A liner for a water closet tank produced according to the present invention will adhere to the inside surfaces of the tank thereby preventing any water from finding its way therebetween which would encourage bacterial growth. The liner always fits the tank properly since it is formed in place so that there is no danger of the liner becoming distorted or broken due to an improper fit. Since the liner forms a bond with the inner surfaces of the tank, the liner is in effect integral therewith to form a permanent part of the tank. The liner serves as insulation to keep the temperature of the tank above the dew point of the surrounding atmosphere to thereby reduce the likelihood of condensation forming on the exterior of the tank and subsequent dripping thereof.

It is to be understood that the invention hereinbefore described is not limited in its application to the details of construction and arrangement of parts illustrated in the accompanying drawings, since the invention is capable of other embodiments and of being practiced or carried out in various ways. Also, it is to be understood that the phraseology or terminology employed is for the purpose of description and not of limitation.

The invention hereinabove described may be varied in construction within the scope of the claims, for the particular device selected to illustrate the invention is but one of many possible embodiments of the same.

What is claimed is:

1. A ceramic water closet flush tank, comprising a bottom wall and upright walls defining said tank, said bottom wall having an outlet opening, a vinyl plastisol insulating liner in said tank, said insulating liner being formed and hardened-in-place within the tank by pouring liquid vinyl plastisol into the tank and allowing it to gel adjacent the tank surfaces to thereby form an integral layer of a tough, stable, one-piece, homogenous mass of vinyl plastisol which conforms to the internal shape of the tank, said liner having an opening corresponding to said outlet opening in said tank bottom wall whereby the wall of said liner defining said opening form a continuation of the wall in said tank bottom wall defining said outlet opening, means between the inside surfaces of the tank and the liner causing said liner to be bonded to and in effect integral with the tank thereby forming a permanent part of the tank and eliminating voids and preventing bacterial growth between the tank and liner, said liner insulating the tank from the water therein to reduce condensation of moisture on the outside of the tank.

2. A ceramic water closet flush tank comprising a bottom wall and upright walls defining said tank, a vinyl plastisol insulating liner in said tank, said insulating liner being formed and hardened-in-place within the tank by pouring liquid vinyl plastisol into the tank and allowing it to gel adjacent the tank surfaces to thereby form an integral layer of a tough, stable, one-piece, homogenous mass of vinyl plastisol which conforms to the internal shape of the tank, means between the inside surfaces of the tank and the liner causing said liner to be bonded to and in effect integral with the tank thereby forming a permanent part of the tank and eliminating voids and preventing bacterial growth between the tank and liner, said liner insulating the tank from the water therein to reduce condensation of moisture on the outside of the tank.

References Cited by the Examiner

UNITED STATES PATENTS

| | | | |
|---|---|---|---|
| 853,828 | 5/07 | Reynolds | 4—68 |
| 1,992,008 | 2/35 | Innis | 4—173 |
| 2,769,981 | 11/56 | Jaye | 4—18 |
| 2,880,467 | 4/59 | Wibbens | 18—58 |
| 2,939,180 | 6/60 | Hickler et al. | 18—58 |

LEWIS J. LENNY, *Primary Examiner.*

FRANK E. BAILEY, EDWARD V. BENHAM,
*Examiners.*